US011001977B2

(12) United States Patent
Utterodt et al.

(10) Patent No.: US 11,001,977 B2
(45) Date of Patent: May 11, 2021

(54) PAVING MACHINE FOR APPLYING VARYING CROWN PROFILES

(71) Applicants:Caterpillar Paving Products Inc., Brooklyn Park, MN (US); Ammann Schweiz AG, Langenthal (CH)

(72) Inventors: Ronald Utterodt, Lutten (DE); Marcus Utterodt, Langenthal (CH)

(73) Assignee: Ammann Schweiz AG, Langenthal (CH)

( * ) Notice: Subject to any disclaimer, the term of this patent is extended or adjusted under 35 U.S.C. 154(b) by 211 days.

(21) Appl. No.: 15/434,452

(22) Filed: Feb. 16, 2017

(65) Prior Publication Data

US 2017/0233958 A1    Aug. 17, 2017

(30) Foreign Application Priority Data

Feb. 17, 2016    (EP) .................................... 16156171

(51) Int. Cl.
| | |
|---|---|
| *E01C 19/48* | (2006.01) |
| *E01C 23/01* | (2006.01) |
| *G01C 22/02* | (2006.01) |
| *G01S 19/24* | (2010.01) |

(52) U.S. Cl.
CPC .............. *E01C 23/01* (2013.01); *E01C 19/48* (2013.01); *E01C 19/4833* (2013.01); *E01C 19/4893* (2013.01); *G01C 22/02* (2013.01); *G01S 19/24* (2013.01); *E01C 2301/16* (2013.01)

(58) Field of Classification Search
CPC ......... G01C 22/02; G01S 19/24; E01C 19/48; E01C 19/4833; E01C 19/4893; E01C 23/01; E01C 2301/16
See application file for complete search history.

(56) References Cited

U.S. PATENT DOCUMENTS

| | | | | |
|---|---|---|---|---|
| 3,559,544 | A | * | 2/1971 | Miller ..................... E01C 19/42 404/96 |
| 3,602,113 | A | | 8/1971 | Davin et al. |
| 5,356,238 | A | | 10/1994 | Musil et al. |
| | | | (Continued) | |

OTHER PUBLICATIONS

European Search Report dated Jun. 7, 2016, issued in European Application No. EP 16156171 (2 pages).

*Primary Examiner* — Hunter B Lonsberry
*Assistant Examiner* — Matthew J. Reda
(74) *Attorney, Agent, or Firm* — Finnegan, Henderson, Farabow, Garrett & Dunner, LLP

(57) ABSTRACT

A paving machine is disclosed. The paving machine may have a screed assembly having a left screed section and a right screed section. The paving machine may also have a crown actuator configured to pivot the left and right screed sections about the centerline. The paving machine may have a crown profile sensor configured to detect the crown profile (DP), and a cross slope sensor configured to detect a cross slope (QNL*, QNR*) of the screed assembly. Further, the paving machine may have a controller configured to determine the crown profile (DP) and a cross slope (QNL*, QNR*) of the screed assembly. The controller may calculate a left cross slope (QNL) of the left screed section and a right cross slope (QNR) of the right screed section based on the determined crown profile (DP) and the determined cross slope (QNL*, QNR*), and display the crown profile on the display device.

17 Claims, 5 Drawing Sheets

(56) References Cited

U.S. PATENT DOCUMENTS

| | | |
|---|---|---|
| 5,401,115 A | 3/1995 | Musil et al. |
| 5,631,732 A | 5/1997 | Schrum, Jr. |
| 5,799,403 A | 9/1998 | Schrum |
| 6,109,825 A * | 8/2000 | Yon ..................... E01C 19/4893 404/84.05 |
| 7,946,787 B2 | 5/2011 | Glee et al. |
| 8,382,395 B2 | 2/2013 | Glee et al. |
| 9,045,871 B2 | 6/2015 | Graham et al. |
| 2004/0161299 A1* | 8/2004 | Smith ..................... E01C 23/07 404/75 |
| 2006/0045620 A1 | 3/2006 | Olson et al. |
| 2012/0051839 A1* | 3/2012 | Begley ................... E01C 19/48 404/72 |
| 2014/0186115 A1* | 7/2014 | Graham ................. E01C 23/07 404/75 |
| 2015/0063907 A1* | 3/2015 | Graham ................. E01C 23/07 404/84.1 |
| 2016/0115654 A1* | 4/2016 | Pedersen ................ E01C 23/07 404/75 |
| 2016/0177517 A1* | 6/2016 | Engels ..................... G06K 9/52 404/75 |

\* cited by examiner

PAVING MACHINE FOR APPLYING VARYING CROWN PROFILES

CLAIM FOR PRIORITY

This application claims benefit of priority of European Patent Application No. 16156171.7, filed Feb. 17, 2016, which is incorporated herein by reference.

TECHNICAL FIELD

The present disclosure generally relates to paving machines and, more particularly, to a system for adjusting a crown profile and a cross slope of a paving applied by a paving machine.

BACKGROUND

Paving machines are commonly used to apply, spread and compact a paving, i.e., a mat of material, relatively evenly over a work surface. These machines are generally used in the construction of roads, parking lots and other areas. An asphalt paving machine generally includes a hopper for receiving asphalt material from a truck, and a conveyor system for transferring the asphalt rearwardly from the hopper for discharge onto a roadbed. A screed plate smooths and somewhat compacts the asphalt material, ideally leaving behind a roadbed of uniform depth and smoothness.

In order to help achieve the desired uniform depth and smoothness, as well as to accommodate different desired roadbed configurations, the screed assembly may include a variety of adjustments. These adjustments can be used to vary, for example, the thickness of the mat as well as the degree of any crown and the cross slopes of the same. The set-up of the screed assembly to achieve the desired roadbed configurations may be relatively complicated. This can result in defects and/or deviations from the desired configuration.

The disclosed systems and methods are directed at least in part to overcoming the above disadvantages.

SUMMARY OF THE DISCLOSURE

In one aspect, a paving machine comprises a screed assembly having a left screed section and a right screed section. The left and right screed sections are pivotable about a center line so as to provide an adjustable crown profile. A crown actuator is provided for pivoting the left and right screed sections about the center line. Further, a crown profile sensor is configured to detect the crown profile. A cross slope sensor is configured to detect a cross slope of the screed assembly, and a display device is configured to display information indicative of a configuration of the screed assembly. A controller is in communication with the crown position sensor, the cross slope sensor and the display device. The controller is configured to receive a first input from the crown profile sensor and determine the crown profile based on the first input, and receive a second input from the cross slope sensor and determine the cross slope of the screed assembly based on the second input. The controller is further configured to calculate a left cross slope of the left screed section and a right cross slope of the right screed section based on the determined crown profile and the determined cross slope. Finally, the controller is configured to display the crown profile, the left cross slope and the right cross slope on the display device.

In another aspect of the disclosure, a method for applying a paving using a paving machine comprising a screed assembly having a left screed section and a right screed section, the left and right screed sections being pivotable about a centreline so as to provide an adjustable crown profile, comprises detecting the crown profile of the screed assembly, detecting a cross slope of the screed assembly, calculating a left cross slope of the left screed section and a right cross slope of the right screed section based on the detected crown profile and the detected cross slope, and displaying the crown profile, the left cross slope and the right cross slope on a display device of the paving machine.

Other features and aspects of the present disclosure will be apparent from the following description and the accompanying drawings.

DETAILED DESCRIPTION

Figure 1:
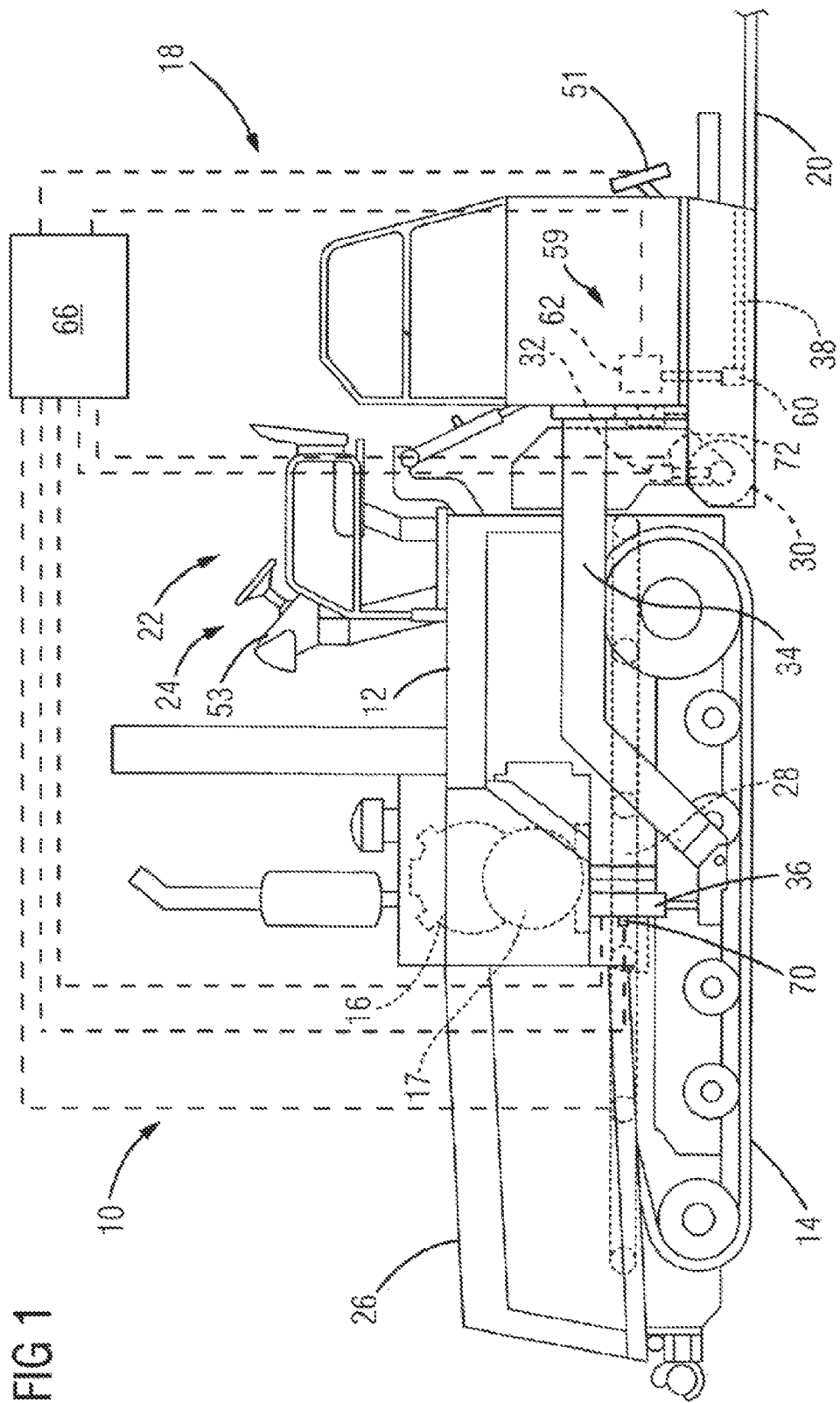
FIG. 1 is a diagrammatic side view of a paving machine towing a screed assembly in accordance with the present disclosure.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as a limiting description of the scope of protection. Rather, the scope of protection shall be defined by the appended claims.

The present disclosure may be based in part on the realization that paving of an asphalt layer with varying crown profiles and cross slopes may be very demanding and pose many challenges to the paving team. In particular, cross slopes of a left lane of a road and a right lane of a road may change significantly over distances of several tens of meters. For example, in a first road section, both cross slopes may be oriented towards the left side of the road, but different from each other. Subsequently, both the left cross slope and the right cross slope may need to be varied over a given distance, resulting in a varying crown profile. In order to achieve the desired configuration of the asphalt layer, both the crown profile and the cross slope of the screed assembly must be changed continuously. In accordance with the present disclosure, this is greatly simplified by continuously displaying the present configuration of the screed assembly on a display device provided on the paving machine. In this manner, the paving team can easily identify the current configuration of the screed assembly at all times, and compare the same to the desired configuration of the asphalt layer. Therefore, the paving team can easily recognize which adjustments of the screed assembly are necessary to achieve the desired configuration of the asphalt layer.

Further, the present disclosure may be based in part on the realization that it may be advantageous to provide an input device for inputting a desired configuration of the asphalt layer. This may further simplify identifying the necessary adjustments and controlling the screed assembly accordingly.

In a further step, the present disclosure may allow for calibration of the sensors provided on the paving machine using the input device and the display device, thereby also greatly simplifying the comparison between the current configuration of the screed assembly and the desired configuration of the asphalt layer. After calibration, in a further step, the present disclosure may allow for an automatic adjustment of the screed assembly to achieve the desired configuration of the asphalt layer as the paving machine travels along the work surface.

In addition, the present disclosure may be based at least in part on the realization that it may be advantageous to automatically update the desired configuration of the asphalt layer based on the distance travelled by the paving machine, and to compensate, for example, a slip of the tracks or the wheels of the paving machine by using positioning technology. In this manner, a correspondence between the desired cross slopes and crown profiles of the asphalt layer and the position of the paving machine on the surface can be reliably established.

Referring to FIG. 1, a paving machine 10 includes a frame 12 with a set of ground-engaging elements 14 such as wheels or tracks coupled with the frame 12. The ground-engaging elements 14 may be driven by an engine 16 in a conventional manner. The engine 16 may further drive an associated generator 17 that can be used to power various systems on the paving machine 10. A screed assembly 18 is attached at the rear end of the paving machine 10 to spread and compact paving material into a paving or mat 20 having a desired thickness, size, uniformity, crown profile and cross slope. The paving machine 10 also includes an operator station 22 having a seat and a console 24, which includes various controls for directing operations of the paving machine.

The paving machine 10 further includes a hopper 26 for storing a paving material, and a conveyor system including one or more conveyors 28 configured to move paving material from the hopper 26 to the screed assembly 18 at the rear of the paving machine 10.

One or more augers 30 are arranged near the forward end of the screed assembly 18 to receive the paving material supplied by the conveyor 28 and spread the material evenly beneath the screed assembly 18. The height of the augers 30 is adjustable via one or more height adjustment actuators 32, for example, hydraulic cylinders.

The screed assembly 18 is pivotally connected behind the paving machine 10 by a pair of tow arms 34 (only one of which is shown in FIG. 1) that extend between the frame 12 of the paving machine and the screed assembly 18. The tow arms 34 are pivotally connected to the frame 12 such that the relative position and orientation of the screed assembly 18 relative to the frame and to the surface being paved may be adjusted by pivoting the tow arms 34, for example, in order to control the thickness of the paving material deposited by the paving machine 10. To this end, tow arm actuators 36 are provided that are arranged and configured to raise and lower the tow arms 34 and thereby raise and lower the screed assembly 18. The tow arm actuators 36 may be any suitable actuators, for example, hydraulic cylinders.

Figure 2:
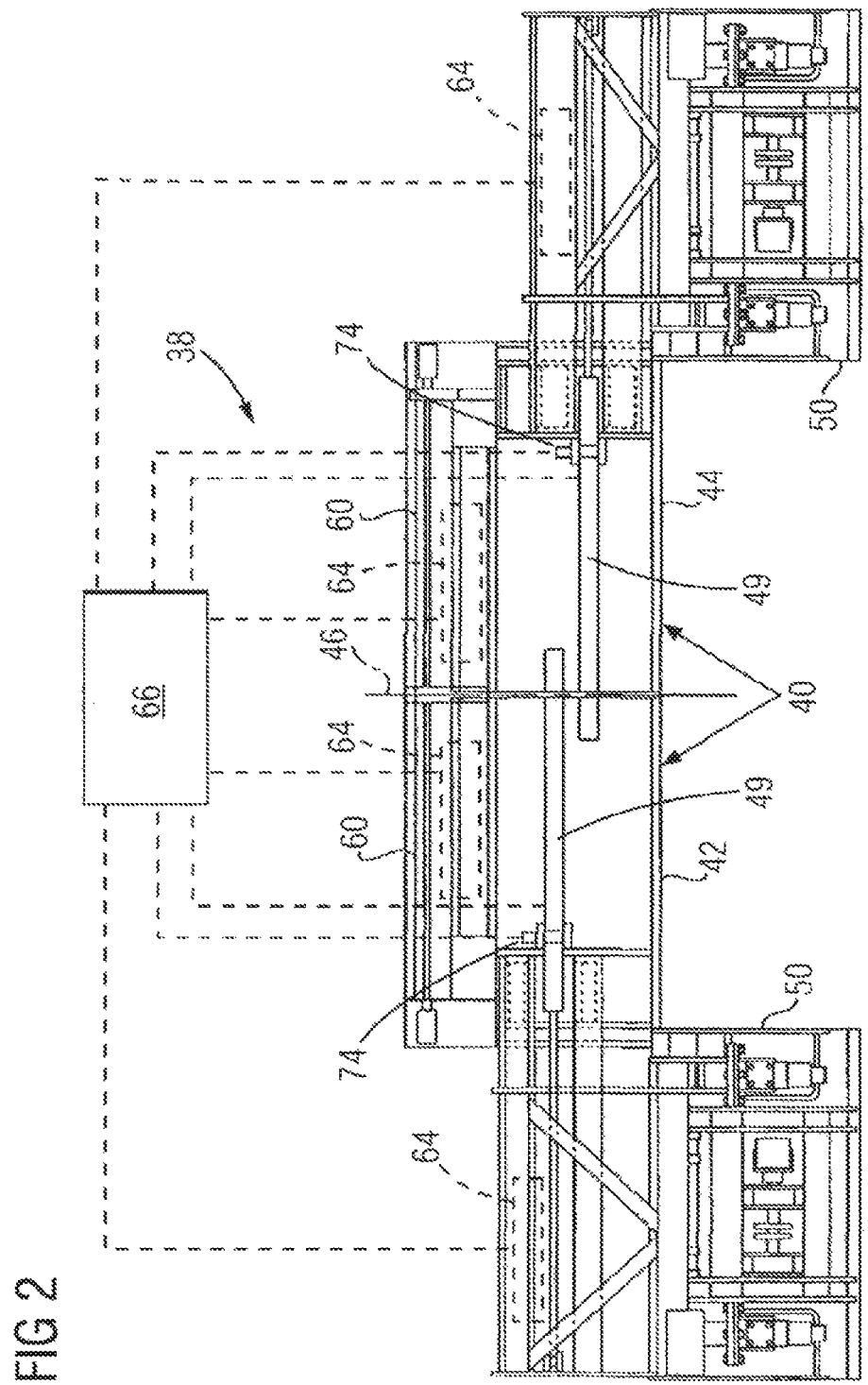
FIG. 2 is a plan view of the screed assembly of FIG. 1.

The screed assembly 18 may have any of a number of configurations known in the art, in particular, it may be a multiple section screed that has an adjustable crown profile and may include extensions, as described in more detail below. As shown in FIG. 2, the screed assembly 18 is provided with a screed plate 38 including a main screed section 40 with a left and a right screed section 42, 44. The left and right screed sections 42, 44 are connected to one another along a longitudinal centerline 46 extending in a longitudinal direction, i.e., the travelling direction, of the paving machine 10 and are capable of being disposed at an angle relative to each other in order to perform a crowning of the paved road surface. A crown actuator 65 (see FIG. 4) such as a hydraulic or other suitable actuator is provided and configured so as to be able to pivot the left and right screed sections 42, 44 relative to each other about the centreline 46 to produce the desired crown.

A screed extension 50 may be provided behind and adjacent to each of the left and right screed sections 42, 44. The screed extensions 50 are slideably movable laterally between retracted and extended positions such that varying widths of paving material can be laid. The lateral movement of the extensions 50 may be driven by respective screed width actuators 49, such as hydraulic or electric actuators. It should be noted, however, that in other embodiments the screed extensions 50 may be omitted.

As shown in FIG. 1, the screed assembly 18 may also include a tamper bar assembly 59 positioned forward of the main screed section 40 and extending transversely to the direction of travel of the paving machine 10. The tamper bar assembly 59 may include a tamper bar 60 powered by a tamper bar drive mechanism 62. To further aid in compaction of the paving material, the screed assembly 18 may also include vibration mechanisms 64, which are schematically shown in FIG. 2.

Figure 3:
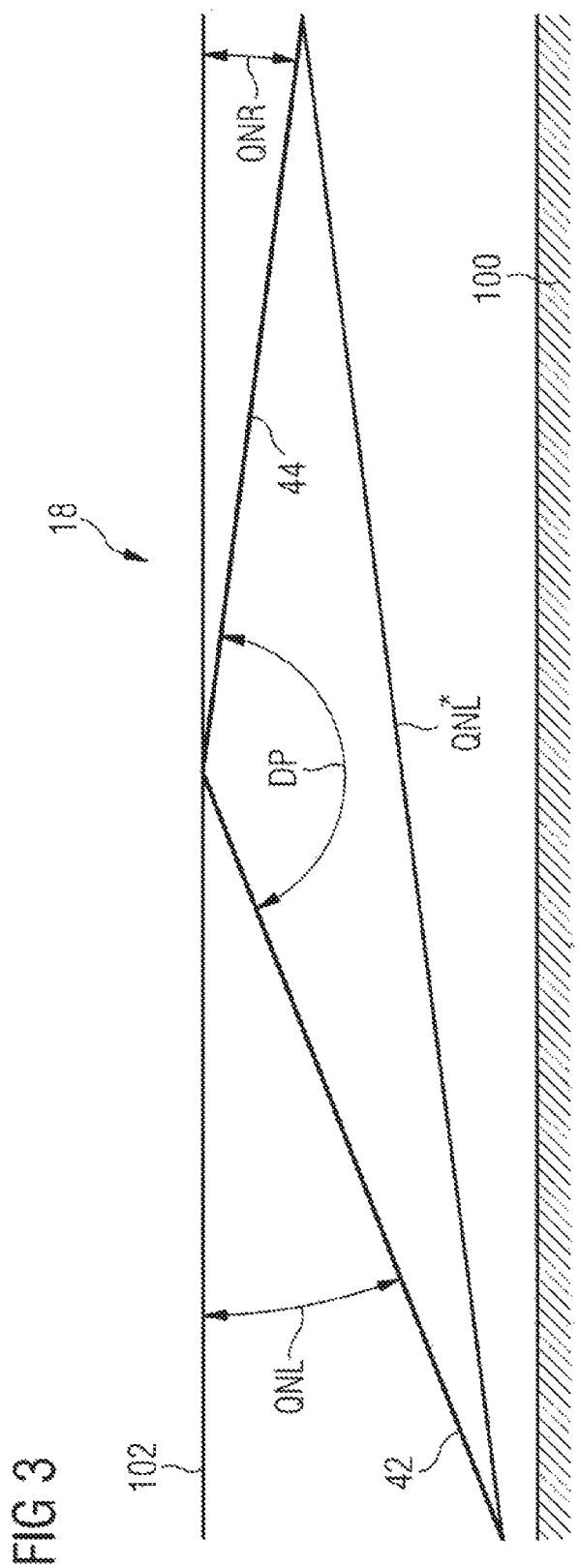
FIG. 3 is a schematic illustration of a configuration of the screed assembly of FIG. 2.

FIG. 3 shows a schematic illustration of a crown or crown profile of the screed assembly 18. In FIG. 18, reference sign 100 indicates a surface on which the paving machine 10 travels in order to apply the paving material. As shown in FIG. 3, the orientation of the left and right screed sections 42, 44 can be characterized by a left cross slope QNL of the left screed section 42 and a right cross slope QNR of the right screed section 44. The angle between the left screed section 42 and the right screed section 44 defines the crown profile or crown position DP. The left cross slope QNL and the right cross slope QNR are measured with respect to a horizontal line 102. In addition, FIG. 3 shows a resulting cross slope QNL*, which indicates the resulting cross slope of the screed assembly 18 with respect to the horizontal line 102. It will be readily apparent that the following equations can be used to describe the configuration of the screed assembly 18 in case of a (positive) cross profile as shown in FIG. 3, where QNL and QNR have positive values:

$$DP = (QNL + QNR)/2 \qquad (1)$$

$$QNL^* = QNL - DP \qquad (2)$$

Here, it should be noted that the resulting cross slope to the left QNL* has the same absolute value, but opposite sign, as the resulting cross slope to the right QNR*, which is defined as follows:

$$QNR^* = QNR - DP \qquad (3)$$

In case of a negative crown profile DP, i.e., a cross profile where at least one of QNR and QNL has a negative value, the following relations hold:

$$DP = (|QNL| + |QNR|)/(-2) \qquad (4)$$

$$QNL^* = (QNL - QNR)/2 \qquad (5)$$

$$QNR^* = (QNR - QNL)/2 \qquad (6)$$

As will be readily appreciated by the skilled person, the quantities QNL, QNR and DP are commonly used as the quantities characterizing the desired configuration of the asphalt layer to be laid be the paving machine 10. The resulting cross slope QNL*, QNR* of the screed assembly 18 can be adjusted by raising and lowering the tow arms 34 by using the tow arm actuators 36. The crown profile or crown position DP can be adjusted by actuating the crown actuator 48.

To coordinate and control various systems and components associated with the paving machine 10, including the screed assembly 18, an electronic or computerized control unit, module or controller 66 is provided. The controller 66 is adapted to monitor various operating parameters and to regulate various variables and functions affecting the operation of the paving machine. The controller 66 can include a microprocessor, an application specific integrated circuit (ASIC) or other appropriate circuitry and can have a memory or other data storage capabilities. The controller can include functions, steps, routines, data tables, data maps, charts and the like saved in and executed from the memory to control the paving machine. Although in the figures the controller 66 is illustrated as a single, discrete unit, in other embodiments, the controller and its functions may be distributed among a plurality of distinct and separate components. To receive operating parameters and send control demands and instructions, the controller 66 is operatively associated and can communicate with various sensors and controllers on the paving machine 10, as described in more detail below. Communication between the controller 66 and the sensors can be established by sending and receiving digital or analog signals across electronic communication lines or communication busses, including wireless communications. In FIGS. 1 and 2, the various communication and command channels are indicated in dashed lines for illustration purposes.

In order to allow operators of the paving machine to enter and receive information concerning the operation of the paving machine, one or more user interfaces may be provided that are in communication with the controller 66. For the convenience of operators, the user interfaces may be located at various different locations on the paving machine 10. For example, a user interface 53 may be provided at the operator station 22 so as to be accessible to an operator sitting in the operator station, and one or more additional user interfaces 51, 52 (see FIG. 4) may be arranged at a lower position than or adjacent to the screed assembly 18 so as the be accessible to operators standing on the ground or rear walkway. Each user interface may include one or more input devices for changing settings of the paving machine 10, and one or more display devices for displaying the configuration of one or more components of the paving machine 10, for example, the configuration of the screed assembly 18. This will be described in more detail below. The input device may be any type of input apparatus, and the display device may also be any type of known display devices. In some embodiments, the input devices and display devices may be combined into a single device, for example, a touchscreen or the like.

To monitor and control the various different possible adjustments to the configuration of the screed assembly 18, the controller 66 communicates with various sensors. In particular, the controller 66 communicates with one or more tow arm position sensor 70 that monitor the position of the tow arms 34, as well as one or more auger position sensors 72 that monitor the vertical position of the augers 30 (see FIG. 1). Additionally, the controller 66 may communicate with one or more screed width sensors 74 that monitor the distance at which the screed extensions 50 are extended in the lateral direction (see FIG. 2). The controller 66 also communicates with a crown profile sensor 63 that monitors the relative orientation of the left and right screed sections 42, 44 with respect to the centreline 46, and a cross slope sensor 58 that measures the cross slope of the screed assembly 18 (see FIG. 4). In addition to receiving information from the sensors, the controller 66 also communicates with and is configured to control the corresponding actuators, including the tow arm actuators 36, the auger height actuators 32, the screed width actuators 49, and the crown actuator 65.

Figure 4:
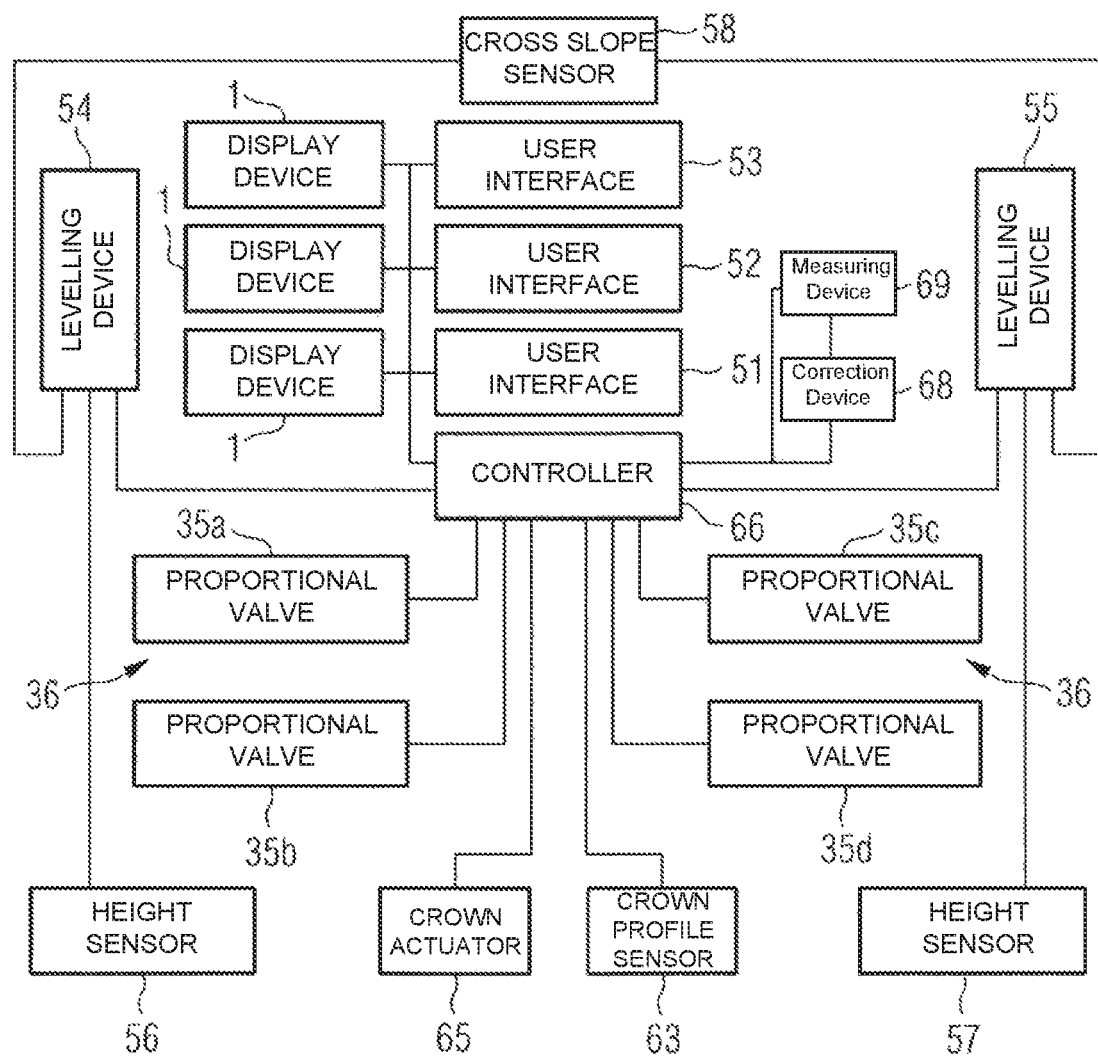
FIG. 4 is a block diagram showing a configuration of the asphalt paving machine of FIG. 1 in accordance with the present disclosure.

FIG. 4 shows a block diagram of the controller 66 and the various sensors and actuators in communication with the controller 66. As shown in FIG. 4, the operator interface 53 includes or is connected to a display device 1 for displaying the configuration of one or more components of the paving machine 10. A left screed user interface 52 is also connected to or includes a display device 1, which allows an operator to be positioned adjacent to the left side of the screed assembly 18 to view the respective configurations. Likewise, a right screed user interface 52 is also connected to or includes a display device 1 for displaying the respective configurations. As shown in FIG. 3, the controller 66 is connected to the user interfaces 51, 52, 53 and the display devices 1. A left screed levelling device 54 and a right screed levelling device 55 are respectively configured and arranged to allow levelling of the screed assembly 18 by operating the tow arm actuators 36. In particular, a pair of proportional valves 35a, 35b may be provided for the tow arm actuator 36 associated with the left tow arm 34, and a pair of proportional valves 35c, 35d may be associated with the right tow arm actuator 36 for the right tow arm 34. The manner in which the screed assembly 18 can be adjusted to control the thickness of the paving material by actuating the tow arm actuators 36 is well known and will not be described in detail.

The cross slope sensor 58 is configured to detect a (resulting) cross slope QNL* (QNR*) of the screed assembly 18. The cross slope sensor 58 is connected to the controller 66 via the left screed levelling device 54 and the right screed levelling device 55, respectively. It should be appreciated that in other embodiments the cross slope sensor 58 may be directly connected to the controller 66.

As further shown in FIG. 4, the controller 66 is also connected to the crown actuator 65 and the crown profile sensor 63. In addition, a left height sensor 56 for the left side of the screed assembly 18 and a right height sensor 57 for the right side of the screed assembly 18 are also connected to the controller 66 via the left screed levelling device 54 and the right screed levelling device 55. The left and right height sensors 56, 57 are configured to measure a distance to the surface at the left and right screed sections 42, 44, respectively, in order to determine the thickness of the material applied by the paving machine 10 in a known manner. Again, it should be appreciated that in other embodiments the left height sensor 56 and the right height sensor 57 may be directly connected to the controller 66.

A travel distance measurement device 68 is configured to measure a distance travelled by the paving machine 10 and connected to the controller 66. Based on the input received from the travel distance measurement device 68, the controller 66 may determine the distance travelled by the paving machine 10. As will be described in more detail below, the controller 66 may be configured to adjust the configuration of one or more components of the paving machine 10 based on the distance travelled by the same. A travel distance correction device 69 is configured to correct travel distance measurements by the travel distance measurement device 68. For example, the travel distance correction device may include one or more of a laser measurement device, a GPS data acquisition device and an RTK data acquisition device. The controller 66 may use the inputs received from the travel distance correction device 69 to correct the estimate of the travel distance based on the inputs from the travel distance measurement device 68.

Figure 5:
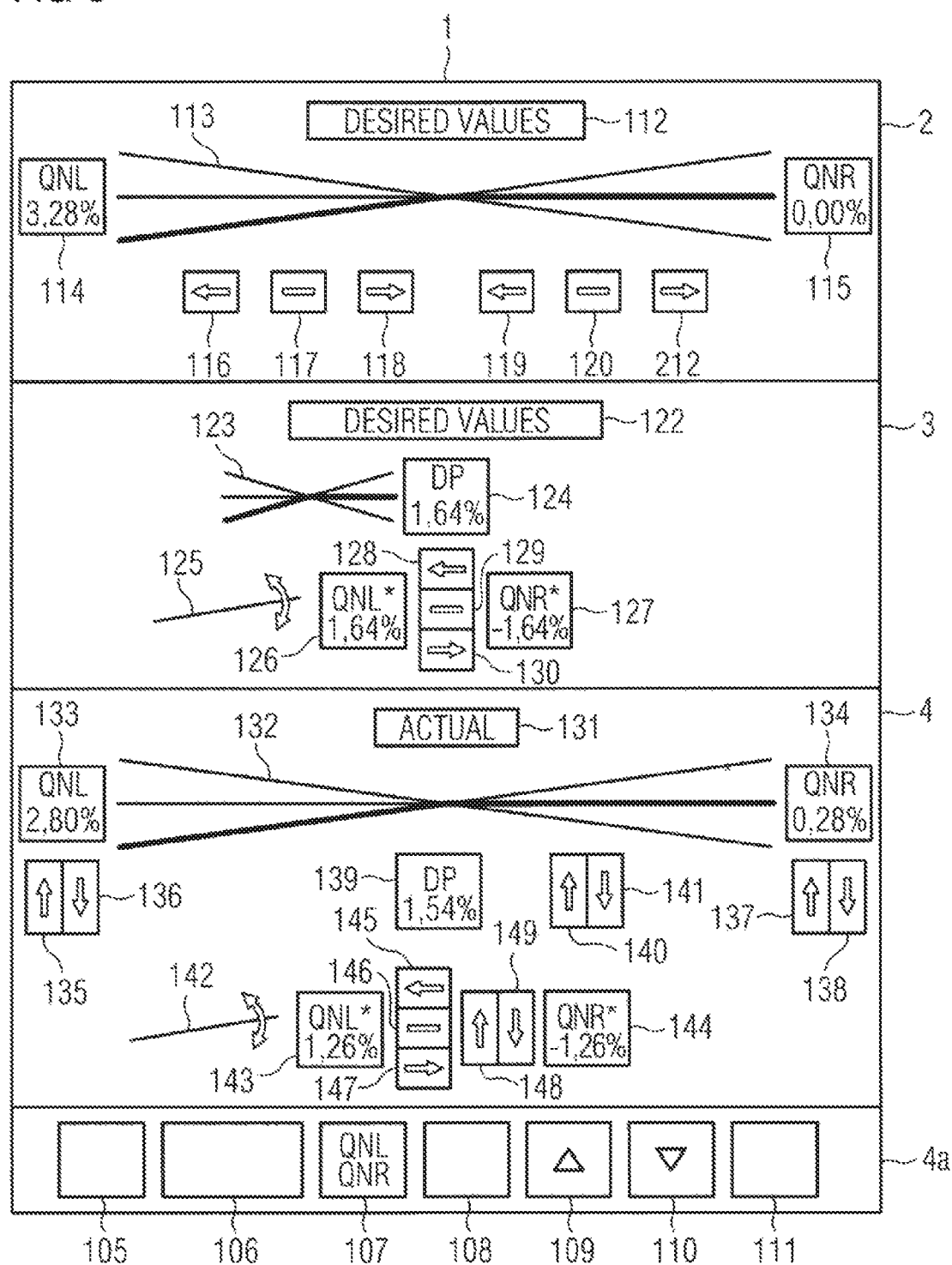
FIG. 5 shows a display device provided on the asphalt paving machine in accordance with the present disclosure.

Referring now to FIG. 5, an exemplary configuration of the display device 1 is described. As shown in FIG. 5, the display device 1 includes a first display section 2, a second display section 3, a third display section 4 and an input section 4a.

The first display section 2 includes a first indicator 112 indicating the type of information being displayed on the display section 2. For example, in the present embodiment, the first indicator 112 indicates that the first display section 2 displays the desired values set for the left cross slope QNL and the right cross slope QNR of the asphalt layer to be applied by the paving machine 10. The set desired left cross slope QNL and the set desired cross slope QNR are indicated in corresponding display fields 114, 115 within the first display section 2. In addition, a graphical representation 113 displayed in the first display section 2 illustrates the resulting profile of the asphalt layer. Additional display symbols 116-121 in the form of arrows pointing to the left and to the right or a straight line serve as additional indicators for the set profile, for example, by highlighting corresponding ones of the arrows or the like.

The second display section 3 includes a second indicator 122 indicating the type of information displayed in the second display section 3. In the exemplary embodiment shown in FIG. 5, the second indicator 122 indicates that the second display section 3 shows the desired values for the crown profile DP and the resulting cross slopes QNL* and QNR*. The quantities shown in display section 3 are calculated based on the above equations (1) to (6).

Graphical representations 123, 125 and display fields 124, 126, 127 as well as additional indicators 128, 129, 130 are provided for indicating the calculated desired crown profile DP and the calculated desired cross slopes QNL*, QNR*. For example, depending on whether the resulting cross slope is directed to the left or to the right (i.e., whether QNL* is positive or negative), a corresponding arrow pointing to the left or right is highlighted. The graphical representations 123, 125 are updated accordingly.

The third display section 4 includes a third indicator 131 selectively indicating whether the information displayed on the third display section 4 represents the current configuration of the screed assembly 18, in particular, the left and right screed sections 42, 44. In particular, the third display section 4 includes a first display field 133 for displaying the left cross slope QNL of the left screed section 42, and a second display field 134 for indicating the right cross slope QNR of the right screed section 44 determined on the basis of the measurements by the cross slope sensor 58 and the crown profile sensor 63. A corresponding graphical representation 132 illustrates the resulting crown profile. The indicator 131 is configured to indicate that the cross slopes shown in the fields 133, 134 correspond to the actual values measured for the layer of material applied by the paving machine 10, as will be described in more detail below.

The third display section 4 further comprises display fields 139, 143, 144, respectively, for indicating the crown profile DP and the resulting cross slopes QNL* and QNR*, which are calculated based on the actual values for the left cross slope QNL and the right cross slope QNR on the basis of equations (1) to (6) shown above. Additional indicators 135-138, 140, 141, 145-149 show the kind of correction that is needed, for example, by highlighting corresponding arrows.

The input and display section 4a includes a first input 105 for turning on/off the display device 1 (and, optionally, the user interfaces 51, 52, 53), a second input 106 configured to switch between activating a routine for inputting the desired left and right cross slopes or the actual measured left and right cross slopes and for confirming the input left and right cross slopes. Inputs 107, 108, 109, 110 are provided for allowing an operator to selectively input the desired left cross slope QNL and the desired right cross slope QNR or the actual measured values of the same. For example, input 107 may be configured to allow switching between inputting the left cross slope QNL and the right cross slope QNR. Further, input 108 may be configured to allow changing the sign of the value input for the left cross slope QNL and the right cross slope QNR, respectively. In addition, inputs 109, 110 may be configured to increase or lower the value of the left cross slope QNL and the right cross slope QNR, for example, in predetermined increments. In one example, the increments may be 0.01 percent. Of course, in other embodiments, different increments may be used. Input 111 may be configured to allow selective activation of an automatic adjustment of the screed assembly 18, which will be described in more detail below.

In the following, an exemplary operation of the paving machine 10 in accordance with the present disclosure will be described in more detail.

As previously mentioned, it is generally very difficult to establish a relationship between the configuration of the screed assembly 18 while laying the material and the actual configuration of the material layer, i.e., the height of the material, the crown profile and the left and right cross slopes of the same. According to the present disclosure, it may be greatly simplified to establish such a relationship and to control the actuators for adjusting the configuration of the screed assembly 18 accordingly.

For example, when starting the application of material with the paving machine 10, the operator of the paving machine 10 may input a desired left cross slope QNL and a desired right cross slope QNR. At this stage, the operator operates input 106 of input and display section 4a and enters values for the desired left cross slope QNL and the desired right cross slope QNR using inputs 107, 108, 109, 110.

After successfully inputting the desired left cross slope and the desired right cross slope, the corresponding values and the graphical representation of the same are shown in display fields 114, 115 and represented by graphical representation 113.

Based on the input of the desired left cross slope QNL and the desired right cross slope QNR, the controller 66 calculates the desired crown profile DP and the desired resulting cross slope QNL*, QNR* of the screed assembly 18. The calculated values are displayed in display section 3 in the manner described above.

Next, after travelling a certain distance, for example, 6 meters, the actual left cross slope QNL and the actual right cross slope QNR of the material applied by the paving machine 10 are measured by the paving team.

The measured left and right cross slopes are input via the input and display section 4a by switching from inputting the desired values to inputting the actual measured values using input 106. Again, the values for the left cross slope QNL and the right cross slope QNR can be adjusted using inputs 107, 108, 109 and 110. After the measured values for the left cross slope QNL and the right cross slope QNR have been input, a further actuation of input 106 confirms the input values. Accordingly, the input values are set as the actual values for the left cross slope QNL and the right cross slope QNR of the paving material applied by the paving machine 10. Based on the actual values that have been input, the associated crown profile DP and the associated resulting cross slopes QNL* and QNR* are calculated and also displayed in display section 4 in the manner described above. The indicator 131 indicates that the values displayed in the display section 4 have been confirmed as the actual measured values.

In the next step, the controller 66 compares the desired values for the left cross slope QNL and the right cross slope QNR, which have been input previously and are displayed in display section 2, to the actual measured values of the left cross slope QNL and the right cross slope QNR. In particular, the controller 66 is configured to highlight respective indicators in the display section 4 to indicate the kind of correction that is to be made in case the actual measured values do not match the input desired values. For example, corresponding arrows indicating whether the left cross slope QNL or the right cross slope QNR is to be increased or decreased, and corresponding arrows indicating whether the crown profile, i.e., the angle between the left screed section 42 and the right screed section 44 should be increased or decreased, and additional arrows indicating whether the screed assembly 18 is to be tilted further to the left or to the right are highlighted to indicate to the operator, which adjustments/corrections should be made.

Using the indications in display section 4, the operator of the paving machine 10, or other members of the paving team, for example, operators responsible for the left screed section and the right screed section, can perform the necessary adjustments.

Using the inputs from the cross slope sensor 58 and the crown profile sensor 63, the controller 66 determines the changes in the cross slope and the crown profile of the screed assembly 18, respectively, calculates the resulting changes in the left cross slope QNL of the left screed section 42 and the right cross slope QNR of the right screed section 44, and updates the display in display section 4 to reflect the change in the configuration of the screed assembly 18. In this manner, the cross slope sensor 58 and the crown profile sensor 63 are calibrated with respect to the actual measurement values of the material applied by the paving machine 10. Further, after the calibration, the changes in the left and right cross slopes QNL, QNR, the crown profile DP and the resulting cross slope QNL*, QNR* can be observed on the display section 4. Therefore, it can be easily determined whether a configuration of the screed assembly 18 has been obtained that results in the paving machine 10 applying a layer of material that has the desired values for the left cross slope QNL and the right cross slope QNR.

At this stage, the operator of the paving machine 10 may also actuate input 111 in order to switch to an automatic control of the screed assembly 18. In other words, after calibrating the cross slope sensor 58 and the crown profile sensor 63 with respect to the actual measured values of the applied layer, the operator may switch to an automatic routine for adjusting the tow points of the left and right tow arms 34 and the crown profile of the screed assembly 18 using the controller 66. For example, the controller 66 may be configured to increment/decrement the crown profile DP in a stepwise manner by actuating the crown actuator 65. After each increment/decrement, the controller 66 may be configured to compare the resulting crown profile DP to the desired crown profile DP. In this manner, the desired crown profile DP can be set. After setting the desired crown profile DP, the controller 66 may further be configured to increment/decrement the height of one of the left and right tow arms 34 in a stepwise manner in order to adjust the cross slope of the screed assembly 18. Of course, if necessary, at the same time the thickness of the applied layer may be adjusted based on inputs from the height sensors 56, 57.

For example, as shown in FIG. 5, the controller 66 may be configured to first increase the crown profile in a stepwise manner, and then, for example, raise the tow point of the right tow arm 34 in a stepwise manner to gradually tilt the screed assembly 18 to the left in order to increase the resulting cross slope QNL*, QNR*. At the same time, the height of the applied paving may be determined and, if necessary, corrected based on measurements by the height sensors 56, 57. In this manner, if the automatic control is activated, it can be assured that the controller 66 automatically adjusts the screed assembly 18 such that the left cross slope QNL and the right cross slope QNR as well as the thickness of the material applied by the paving machine 10 matches the desired values. In this respect, it may be provided that the controller 66 includes data, for example, a map that associates the distance travelled by the paving machine 10 with the corresponding values for the desired left cross slope QNL and right cross slope QNR. In this case, it is not necessary for the operator to manually update the desired values, but the controller 66 may automatically update these values and, responsive to the update, perform the automatic control of the screed assembly 18 to obtain the desired values. The operator of the road paver can observe the automatic process by monitoring the display on the display device 1.

In connection with the automatic control described above, sometimes slip of the tracks or wheels of the paving machine may result in errors with respect to the estimated distance travelled by the paving machine 10. In order to compensate such errors, as mentioned above, the travel distance correction device 69 is configured to correct the travel distances measured by the travel distance measurement device 68, for example, based on acquired laser measurement data, acquired GPS data and acquired RTK data. Devices for acquiring such information that can be used in order to correct the measured travel distance are well-known and will not be described in detail herein.

INDUSTRIAL APPLICABILITY

The industrial applicability of the systems and methods disclosed herein will be readily appreciated from the foregoing discussion. One exemplary application is a system and method for controlling a paving machine that is to apply a paving having a varying crown profile and/or varying cross slopes while travelling along a surface on which a layer of material is to be applied.

It will be appreciated that the foregoing description provides examples of the disclosed systems and methods. However, it is contemplated that other implementations of the disclosure may differ in detail from the foregoing examples. For example, in order to assist the operator of the paving machine 10 or the paving team in performing the necessary adjustments of the screed assembly 18, it may be sufficient to provide a display device that is configured to only display the crown profile DP, the left cross slope QNL and the right cross slope QNR obtained based on the measurements performed by the crown profile sensor 63 and the cross slope sensor 58. In other embodiments, no automatic control of the screed assembly 18 may be provided. Instead, the paving machine may be configured such that the operator manually inputs the desired left cross slope QNL and the desired right cross slope QNR and/or manually performs the necessary corrections of the crown profile DP and the cross slope QNL*, QNR* of the screed assembly 18.

All references to the disclosure or examples thereof are intended to reference the particular example being discussed at that point and are not intended to imply any limitation as to the scope of disclosure more generally. All methods described herein may perform in any suitable order unless otherwise indicated herein or clearly contradicted by context.

Accordingly, this disclosure includes all modifications and equivalences of the subject-matter recited in the claims appended hereto as permitted by applicable law. Moreover, any combination of the above-described elements in all possible variations thereof is encompassed by the disclosure unless otherwise indicated herein or clearly contradicted by context.

Although the preferred embodiments of this disclosure have been described herein, improvements and modifications may be incorporated without departing from the scope of the following claims.

The invention claimed is:

1. A method for applying a paving using a paving machine comprising a screed assembly having a left screed section, the left and right screed sections being pivotable about a centreline so as to provide an adjustable crown profile (DP), the method comprising:
    detecting the crown profile (DP) of the screed assembly;
    detecting, using a cross slope sensor, a cross slope (QNL*, QNR*) of the screed assembly;
    calculating a left cross slope (QNL) of the left screed section and a right cross slope (QNR) of the right screed section based on the detected crown profile (DP) and the detected cross slope (QNL*, QNR*);
    receiving an input indicative of a measured left cross slope and a measured right cross slope of the paving applied by the paving machine;
    setting the measured left cross slope as the left cross slope (QNL);
    setting the measured right cross slope as the right cross slope (QNR);
    determining an actual cross slope and an actual crown profile based on the measured left cross slope and the measured right cross slope;
    displaying the crown profile (DP), the left cross slope (QNL) and the right cross slope (QNR), the actual cross slope, and the actual crown profile on a display device of the paving machine; and
    adjusting at least one of a crown actuator or a tow actuator associated with the left and right screed sections automatically or in response to an input received from an operator of the paving machine, based on at least one of the determined crown profile (DP), the left cross slope (QNL), and the right cross slope (QNR).

2. The method according to claim 1, further comprising performing an automatic correction of the cross slope (QNL*, QNR*) and the crown profile (DP) based on a comparison between at least one of the measured left and right cross slopes and desired left and right cross slopes, the actual cross slope and a desired cross slope, and the actual crown profile and a desired crown profile.

3. The method according to claim 1, further comprising:
    measuring a travel distance travelled by the paving machine; and
    dynamically adjusting a desired left cross slope and a desired right cross slope based on the travel distance.

4. The method according to claim 3, further comprising correcting the travel distance based on at least one of acquired laser measurement data, acquired GPS data, and acquired RTK data.

5. A paving machine, comprising:
    a screed assembly having a left screed section and a right screed section, the left and right screed sections being pivotable about a centreline so as to provide an adjustable crown profile;
    a crown actuator configured to pivot the left and right screed sections about the centreline;
    a crown profile sensor configured to detect the crown profile;
    a cross slope sensor configured to detect a cross slope of the screed assembly;
    a display device configured to display information indicative of a configuration of the screed assembly;
    a measurement value input unit configured to receive an input indicative of a measured left cross slope and a measured right cross slope of the paving applied by the paving machine; and
    a controller in communication with the crown profile sensor, the cross slope sensor and the display device, the controller being configured to:
        determine the crown profile based on a first signal received from the crown profile sensor;
        determine the cross slope of the screed assembly based on a second signal received from the cross slope sensor;
        determine an actual cross slope and an actual crown profile based on based on the measured left cross slope and the measured right cross slope; and
        display the crown profile, the cross slope, the actual crown profile, and the actual cross slope on the display device.

6. The paving machine according to claim 5, further comprising a desired value setting unit configured to set a desired left cross slope and a desired right cross slope of a paving to be applied by the paving machine.

7. The paving machine according to claim 6, wherein the display device comprises a set value display unit configured to display the desired left cross slope and the desired right cross slope.

8. The paving machine according to claim 6, wherein the controller is configured to calculate a desired resulting cross slope and a desired crown profile of the screed assembly based on the desired left cross slope and the desired right cross slope.

9. The paving machine according to claim 8, wherein the display device comprises a desired value display unit configured to display the desired resulting cross slope and the desired crown profile.

10. The paving machine according to claim 6,
    wherein the controller is configured to:
        calculate a left cross slope of the left screed section and a right cross slope of the right screed section based on the determined crown profile and the determined cross slope; and set the measured left cross slope as the left cross slope and to set the measured right cross slope as the right cross slope.

11. The paving machine according to claim 10, further comprising a correction indication unit configured to indicate a required correction of the cross slope and the crown profile of the screed assembly.

12. The paving machine according to claim 11, wherein the display device is configured to display at least one indicator indicating the required correction, the at least one indicator including at least one of:
- a first indicator configured to indicate that the left cross slope is to be increased or decreased;
- a second indicator configured to indicate that the right cross slope is to be increased or decreased;
- a third indicator configured to indicate that the crown profile is to be increased or decreased; and
- a fourth indicator indicating that the cross slope is to be increased or decreased.

13. The paving machine according to claim 10, wherein the controller is configured to update the display on the display device in accordance with the first and second signals received from the crown profile sensor and the cross slope sensor.

14. The paving machine according to claim 10, wherein the controller is further configured to perform an automatic correction of the cross slope and the crown profile based on a comparison between at least one of the measured left and right cross slopes and desired left and right cross slopes, the actual cross slope and a desired cross slope, and the actual crown profile and a desired crown profile.

15. The paving machine according to claim 14, wherein the controller is configured to correct the crown profile to match the desired crown profile prior to correcting the cross slope.

16. The paving machine according to claim 14, further comprising a travel distance measurement device configured to measure a travel distance travelled by the paving machine, wherein the controller is configured to dynamically adjust the desired left cross slope and the desired right cross slope based on the distance measured by the travel distance measurement device.

17. The paving machine according to claim 16, further comprising a travel distance correction device configured to correct the travel distance measured by the travel distance measurement device based on at least one of acquired laser measurement data, acquired GPS data, and acquired RTK data.

* * * * *